(12) United States Patent
Fukasawa et al.

(10) Patent No.: US 8,456,292 B2
(45) Date of Patent: Jun. 4, 2013

(54) DOOR MIRROR

(75) Inventors: Yosuke Fukasawa, Ota (JP); Akifumi Suzuki, Kiryu (JP); Tatsuya Sugamoto, Okazaki (JP)

(73) Assignees: Mitsuba Corporation, Kiryu-shi (JP); Toyota Jidosha Kabushiki Kaisha, Toyota (JP)

( * ) Notice: Subject to any disclaimer, the term of this patent is extended or adjusted under 35 U.S.C. 154(b) by 462 days.

(21) Appl. No.: 12/738,527

(22) PCT Filed: Sep. 9, 2008

(86) PCT No.: PCT/JP2008/002479
§ 371 (c)(1),
(2), (4) Date: Apr. 16, 2010

(87) PCT Pub. No.: WO2009/050845
PCT Pub. Date: Apr. 23, 2009

(65) Prior Publication Data
US 2010/0253500 A1   Oct. 7, 2010

(30) Foreign Application Priority Data
Oct. 18, 2007   (JP) ................................. 2007-271421

(51) Int. Cl.
*B60Q 1/34* (2006.01)
(52) U.S. Cl.
USPC ............................ 340/475; 359/850; 362/494

(58) Field of Classification Search
USPC ........... 340/475, 472; 359/850, 871; 362/464, 362/494
See application file for complete search history.

(56) References Cited

U.S. PATENT DOCUMENTS

| | | | | | |
|---|---|---|---|---|---|
| 5,361,190 | A | * | 11/1994 | Roberts et al. | 362/464 |
| 6,086,229 | A | * | 7/2000 | Pastrick | 362/494 |
| 6,511,189 | B1 | * | 1/2003 | Henion et al. | 359/850 |
| 2005/0047160 | A1 | | 3/2005 | Evans | |
| 2005/0276057 | A1 | | 12/2005 | Takahashi et al. | |
| 2006/0274543 | A1 | | 12/2006 | Takahashi et al. | |

FOREIGN PATENT DOCUMENTS

| | | |
|---|---|---|
| CN | 1697743 A | 11/2005 |
| DE | 11 2004 000 033 T5 | 2/2006 |
| JP | A-2002-79878 | 3/2002 |
| JP | A-2002-96683 | 4/2002 |
| JP | A-2004-175260 | 6/2004 |
| JP | A-2004-291671 | 10/2004 |
| JP | A-2006-111128 | 4/2006 |
| JP | A-2006-114309 | 4/2006 |
| WO | WO 2004/085205 A1 | 10/2004 |

* cited by examiner

*Primary Examiner* — John A Tweel, Jr.
(74) *Attorney, Agent, or Firm* — Oliff & Berridge, PLC

(57) ABSTRACT

A door mirror includes a turn signal lamp for indicating a traveling direction; a foot lamp; and a housing that houses the turn signal lamp and the foot lamp, wherein the turn signal lamp and the foot lamp are provided in the housing such that the turn signal lamp and the foot lamp are provided with outer lenses lying adjacent to each other such that light based on a turning on of one lamp is guided to an outer lens of the other lamp.

4 Claims, 3 Drawing Sheets

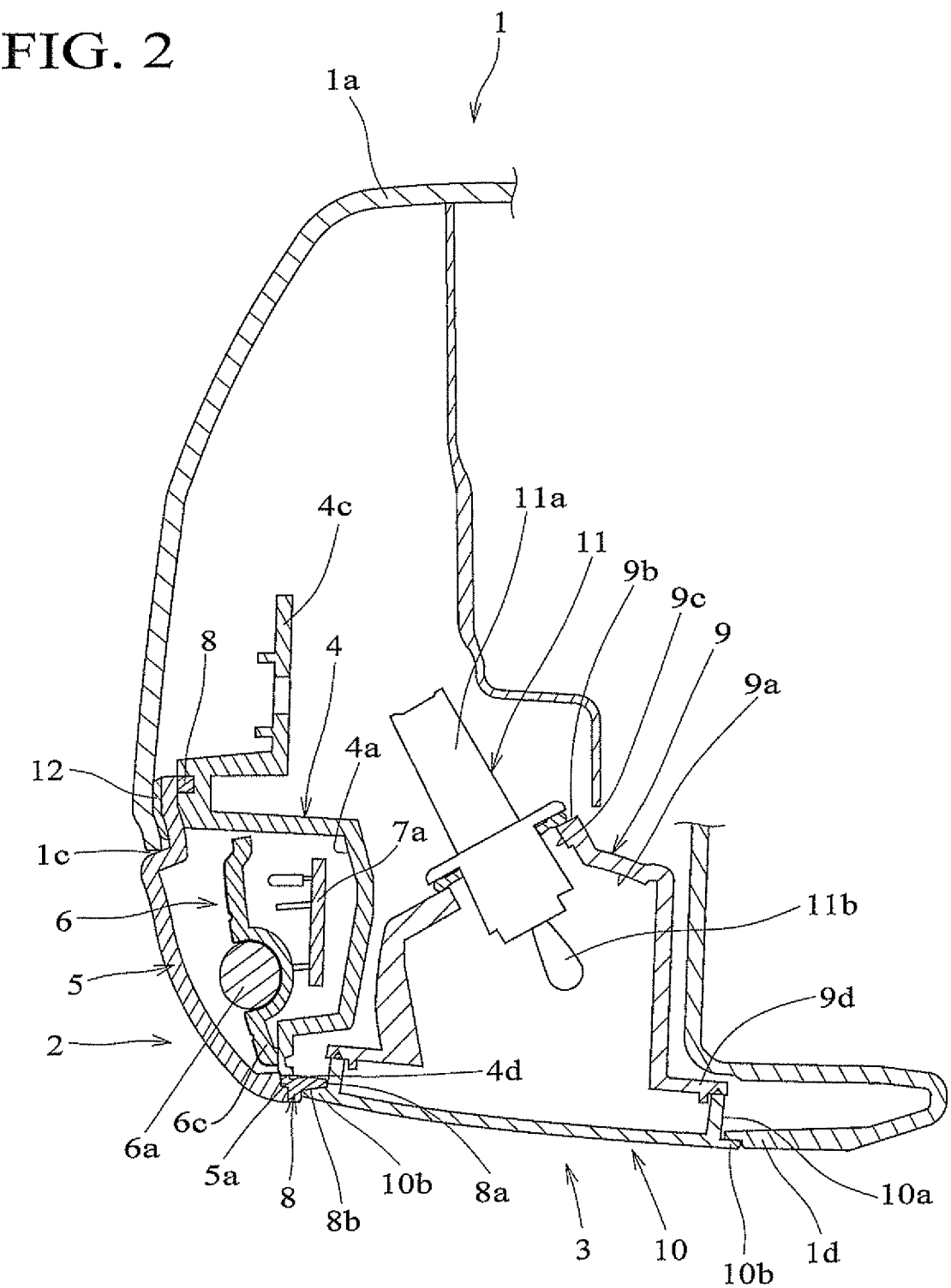

DOOR MIRROR

CROSS-REFERENCE TO RELATED APPLICATIONS

This application is the U.S. National Phase of PCT/JP2008/002479, filed Sep. 9, 2008, which claims priority from Japanese Patent Application No. 2007-271421, filed Oct. 18, 2007, the entire disclosure of which is incorporated herein by reference hereto.

BACKGROUND

The present disclosure relates to a door mirror to be provided on a vehicle such as an automobile.

Generally, a door of a vehicle is provided with a door mirror in order to check a rear side of the vehicle. It has been proposed in recent years to add various functions to the door mirror other than to check a rear side of the vehicle.

For example, Japanese Published Unexampled Patent Application No. 2006-114309 uses a turn signal lamp for indicating the traveling direction (steering direction) of a vehicle on a door mirror so as to strongly attract the attention of people around the vehicle together with a side turn signal lamp, which is provided separately at a front part, at a rear part or the like of the vehicle. In addition, Japanese Published Unexampled Patent Application No. 2004-175260 uses a foot lamp for lighting up a lower part that is installed in a door mirror so that the user can check a door unlocking by turning on the foot lamp at the time of a door unlocking operation using a remote operation key or the like, and can check an area around the user's feet while getting in and out of the vehicle under a low light condition by turning on the foot lamp in association with the opening and closing of a door; and the like.

SUMMARY

However, the conventional techniques propose a structure, wherein a side turn signal lamp and a foot lamp are respectively provided separately at a door mirror. The conventional techniques do not suggest any specific structure for providing the lamps together. The present disclosure intends to solve this problem and other problems, and to provide a structure that can add value to a door mirror provided with the lamps and to achieve various other advantages.

A first exemplary aspect of the present disclosure provides a door mirror for a vehicle, the door mirror including a turn signal lamp for indicating a traveling direction; a foot lamp; and a housing that houses the turn signal lamp and the foot lamp, wherein the turn signal lamp and the foot lamp are provided in the housing such that the turn signal lamp and the foot lamp are provided with outer lenses lying adjacent to each other such that light based on a turning on of one lamp is guided to an outer lens of the other lamp.

A second exemplary aspect of the present disclosure provides a turn signal lamp that is located in front of and below the housing and the foot lamp is located behind the turn signal lamp.

According to exemplary aspects, turning on of one lamp causes light emission from an outer lens of the other lamp. It is thus possible to provide an added-value door mirror wherein light is emitted not only to an area around the user's feet but also forward so as to attract the attention of a third party in front of a vehicle when the door is unlocked by operating a remote operation key, for example.

BRIEF DESCRIPTION OF THE DRAWINGS

Various exemplary aspects will be described with reference to the drawings, wherein:

FIG. 2 is a sectional view of a main part of a door mirror; and

DETAILED DESCRIPTION OF EMBODIMENTS

Figure 1:
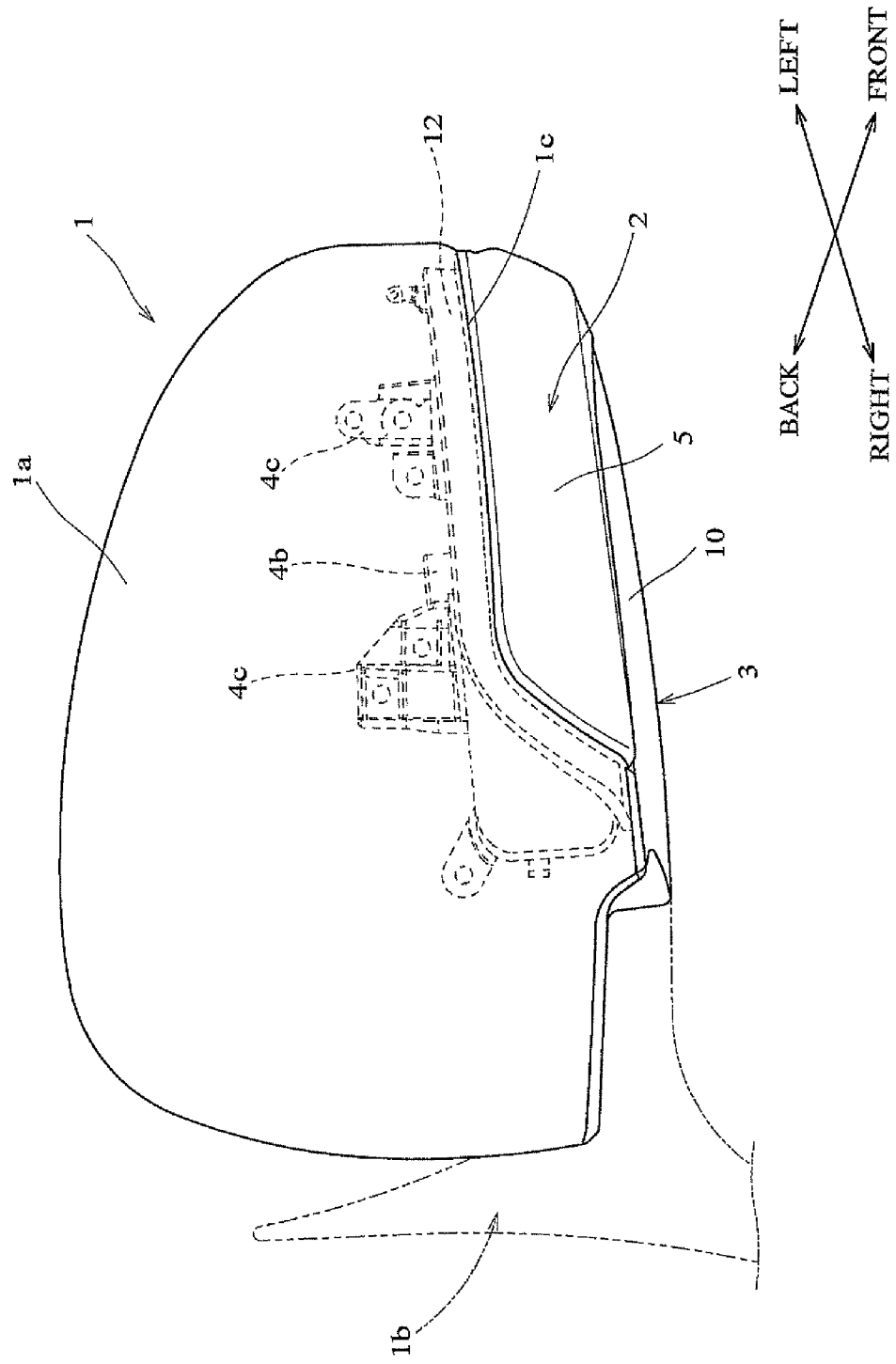
FIG. 1 is an overall perspective view of a door mirror.

Next, a description is given of an embodiment of the present disclosure with reference to the drawings.

Denoted by reference numeral 1 in the drawings is a door mirror, which is to be provided on each of a door on the driver side and a door on the passenger side of a vehicle. In the door mirror 1, an opening part (not illustrated) is formed at an area, which faces rearward (rearward from a vehicle), of a body 1a, and a mirror (not illustrated) in order to check a rear side of the vehicle is fitted in the opening part in such a manner that the position thereof can be freely adjusted. The body 1a is supported at a stay 1b, which is fixed at the door side, so as to be rotatable and can be rotated and switched to a working position where the mirror faces rearward, and a storage position where the mirror is positioned along the door face.

The body 1a is formed in a bowl shape, which is bulging forward from the vehicle and opens rearward, and members for adjusting the position of the mirror and the like are held in the bulging part. Furthermore, an opening 1c is formed at the body 1a by cutting a lower face away from a lower area of a front face, and a turn signal lamp 2 for indicating the traveling direction (steering direction) of the vehicle and a foot lamp 3, which is to be turned on in association with a door unlocking operation using a remote operation key, are provided in the lower area to lie adjacent to each other in the front-rear direction.

Here, bilaterally symmetrical door mirrors 1 are respectively provided on right and left door members of the vehicle, although only a description of a door mirror 1 illustrated in FIG. 1 to be provided on the left side of the vehicle is given here and description of a door mirror 1 on the right side will be omitted.

Each of the turn signal lamp 2 and the foot lamp 3 to be installed in the door mirror 1 is constructed to be installed as an assembly in the opening 1c formed at the body 1a.

Figure 3A:
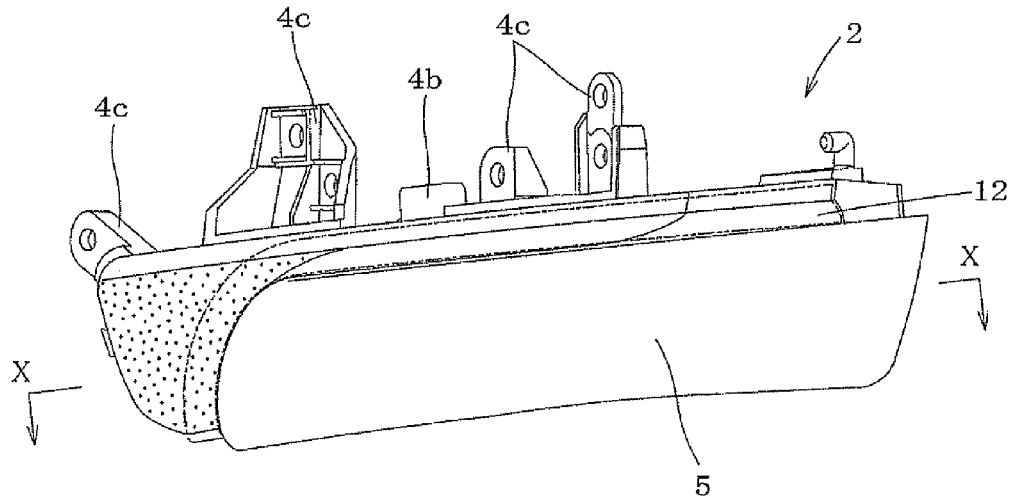
FIGS. 3A, 3B and 3C are respectively a front view of a turn signal lamp, a sectional view along X-X in FIG. 3A, and a side view.
Figure 3B:
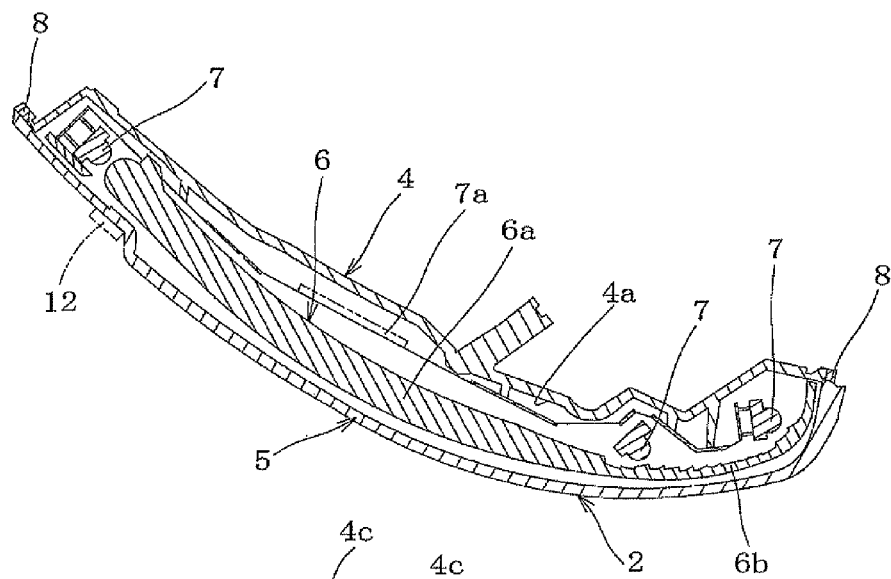
Figure 3C:
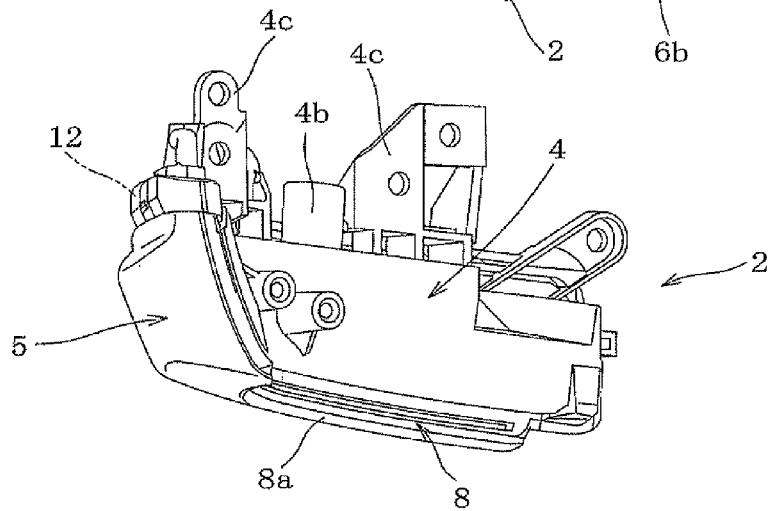

The turn signal lamp 2 is composed of: a turn signal lamp housing 4 to be held inside the body 1a; a turn signal lamp outer lens 5 to be exposed to the outside (forward) together with an outer peripheral face of the body 1a; and an inner housing 6 to be provided between the turn signal lamp housing 4 and the turn signal lamp outer lens 5 as illustrated in FIG. 3B. The turn signal lamp housing 4 is formed of opaque resin material and is provided with a concave part 4a in a concave groove shape, which opens from a front area toward a left area, and the inner housing 6 is held in the concave part 4a. The inner housing 6 is composed of: an elongated light guide part 6a; an inner lens part 6b at the left end side of the light guide part 6a; and a pair of upper and lower flange piece parts 6c, which extend upward and downward from the light guide part 6a and cover the concave part 4a of the turn signal lamp housing 4. Furthermore, the light guide part 6a, a plurality of light emitting diodes 7 for making light enter the inner lens part 6b, and a substrate 7a connected with the light emitting diodes 7 are placed between the inner housing 6 and the turn signal lamp housing 4.

Denoted by reference numeral 4b is a connection part to be connected with an outer power source, and denoted by reference numeral 4c are mounting pieces to be integrated with the body 1a.

On the other hand, the turn signal lamp outer lens 5 is formed by integral molding of transparent resin material and is formed in such a manner that an outer peripheral edge part thereof is made to butt contact with an outer peripheral edge part of the turn signal lamp housing 4. The turn signal lamp 2 is constructed by holding the inner housing 6 in the concave part 4a of the turn signal lamp housing 4, making the outer peripheral edge part of the turn signal lamp outer lens 5 butt joint with an opening end part (outer peripheral edge part) of the turn signal lamp housing 4, which is in a state where the concave part 4a is covered with the flange piece parts 6c, and integrating the butt joint part, which is to be the outer peripheral edge parts of the turn signal lamp housing 4 and the turn signal lamp outer lens 5. A method to inject transparent resin material is adopted in order to integrate in the present embodiment, and therefore a jointing piece 8 made of transparent resin material or other transparent material is formed at the outer peripheral edge parts of the turn signal lamp housing 4 and the turn signal lamp outer lens 5 in butt contact. Here, a butt contact part at a lower part of the turn signal lamp housing 4 and the turn signal lamp outer lens 5 is made to butt contact in a state where the turn signal lamp outer lens 5 extends downward, and the jointing piece 8 is formed by integrating a lower end face 4d of the turn signal lamp housing 4 and a rear end face 5a of the turn signal lamp outer lens 5 so that the turn signal lamp outer lens 5 and the jointing piece 8 are formed successively in the front-rear direction.

It is to be noted that the jointing piece 8 is to be formed in a ring shape on the outer periphery of the turn signal lamp 2, and a step part 8b is formed at the jointing piece 8 positioned at the lower side by forming a protrusion piece 8a protruding rearward.

On the other hand, the foot lamp 3 is composed of: a foot lamp housing 9 to be held inside the body 1a; a foot lamp outer lens 10 to be exposed to the outside (downward) together with an outer peripheral face of the body 1a and with the turn signal lamp outer lens 5 at the turn signal lamp 2 side; and a light source unit 11 supported at the foot lamp housing 9. The foot lamp housing 9 is provided with a concave part 9a in a concave groove shape, which opens downward, and a base part 11a of the light source unit 11 is retained and fitted in a retention hole 9c, which is formed at a groove bottom piece 9b constituting the concave part 9a, with a bulb (or light emitting diode) 11b facing downward.

The foot lamp housing 9 is formed of opaque resin material and a flange piece 9d extending to the outside diameter side is integrally formed at an opening end part, which is to be a lower area, while the foot lamp outer lens 10 is formed of transparent resin material and a rib piece 10a protruding upward is formed at an upper face. The foot lamp 3 is constructed by making an end face of the rib piece 10a butt contact with the flange piece 9c and integrating the foot lamp housing 9 and the foot lamp outer lens 10. It is to be noted that integration can be achieved using a method to inject resin material as in the case of the turn signal lamp 2, although the present embodiment achieves integration by ultrasonic fusion.

The turn signal lamp 2 is set to be installed in the body 1a by fixing and supporting the turn signal lamp 2 at a frame member (not illustrated) placed in the body 1a of the door mirror 1, using the mounting piece parts 4c formed at the turn signal lamp housing 4. Here, an opening edge part of the body 1a is located to cover an area between an upper end part and a right end part of the turn signal lamp outer lens 5, and a sealing member 12 is provided on the turn signal lamp outer lens 5 side so as to achieve waterproofing between the turn signal lamp outer lens 5 and an opening end edge of the body 1a.

Moreover, the foot lamp 3 is set to be installed at a position behind the turn signal lamp 2 by supporting the foot lamp housing 9 at a frame member in a suitable manner. In such an installation state, the foot lamp outer lens 10 is installed in a state where a front end area of an outside diameter side end edge 10b extending to the outside diameter side of the rib piece 10a is made to butt contact with the step part 8b, which is formed at the lower side of the jointing piece 8 on the outer periphery of the turn signal lamp 2, and a rear end area of the outside diameter side end edge 10b is made to butt contact with a rear piece part 1d of the body 1a, and therefore the foot lamp 3 is set to be installed in a positioned manner relative to the body 1a and the turn signal lamp 2. In other words, only a transparent material (jointing piece 8) is placed between a portion of the foot lamp outer lens 10 and a portion of the turn signal lamp outer lens 5 at the lower side.

Moreover, in the above installation state, the turn signal lamp outer lens 5 and the foot lamp outer lens 10, which are transparent members, lie adjacent to each other via the jointing piece 8, which is a transparent member, and therefore the turn signal lamp outer lens 5 and the foot lamp outer lens 10 are set to be formed successively as a continuous transparent member.

Regarding the door mirror 1 installed in such a manner, when power is supplied to the light source unit 11 of the foot lamp 3 and the bulb 11b is turned on, light is emitted outward via the foot lamp outer lens 10 irradiated by the bulb 11b. Here, light entering the foot lamp outer lens 10 is guided from the jointing piece 8 to the turn signal lamp outer lens 5 side of the turn signal lamp 2 so that light is also emitted from the turn signal lamp outer lens 5. Such a structure provides added value such as ensuring security when the foot lamp 3 irradiates a lower part of the door in response to a door member unlocking operation using a remote operation key, which is not illustrated, or making a third party in front of a vehicle aware of the existence of the vehicle, existence of the user and a state of the user getting in and out of the vehicle by emitting light also from the turn signal lamp outer lens 5 in front of the door mirror 1, for example.

On the other hand, when power is supplied to the light emitting diodes 7 of the turn signal lamp 2 and the light emitting diodes 7 are turned on, light is emitted from the light guide part 6a and the inner lens part 6b and light is emitted outward via the turn signal lamp outer lens 5. Here, light entering the turn signal lamp outer lens 5 is guided from the jointing piece 8 to the foot lamp outer lens 10 side of the foot lamp 3 so that light is also emitted from the foot lamp outer lens 10. Such a structure provides added value such as emission of light also from the foot lamp outer lens 10 below the door mirror 1 when a direction indicator, which is not illustrated, is operated and accordingly a corresponding turn signal lamp 2 is turned on, or the level of visibility of the turn signal lamp 2 in a darkened situation is further enhanced.

In the present embodiment having such a structure, the turn signal lamp 2 for indicating the traveling direction and the foot lamp 3 for irradiating a lower part of the door mirror 1 are installed in the body 1a of the door mirror 1, and the lamps 2 and 3 are provided to lie adjacent to each other in the front-rear direction with the turn signal lamp outer lens 5 of the turn signal lamp 2 and the foot lamp outer lens 10 of the foot lamp 3 lying adjacent to each other. When the foot lamp 3 is turned on, light from the foot lamp 3 can be guided to the turn signal lamp outer lens 5 of the turn signal lamp 2 and emitted forward, and there are advantages that, for example, it is possible to ensure security by lighting up an area around the user's feet at the time of door member unlocking and to attract the attention of a third party in front of a vehicle to the existence of the vehicle, for example.

Moreover, when the turn signal lamp 2 is turned on, light from the turn signal lamp 2 is guided to the foot lamp outer lens 10 of the foot lamp 3 and emitted downward, and therefore there is an advantage such as further enhancement of the level of visibility when the turn signal lamp 2 is turned on in a dark place at night, for example. As described above, it is possible to provide an added-value door mirror 1 which can offer advantages other than the specific functions to be performed respectively by the lamps 2 and 3, by providing the outer lenses 5 and 10 of the lamps 2 and 3 that lie adjacent to each other.

The present disclosure is useful for a door mirror to be provided on a vehicle such as an automobile. It is possible to provide an added-value door mirror which can emit light from the foot lamp 3 forward when the foot lamp 3 is turned on and can attract the attention of a third party in front of the vehicle by emitting light not only to an area around the user's feet but also forward at the time of door member unlocking, for example.

Moreover, the present disclosure has an advantage such as further enhancement of the level of visibility since light from the turn signal lamp 2 is emitted downward when the turn signal lamp 2 is turned on.

As described above, it is possible to provide an added-value door mirror 1 which can offer advantages other than the specific functions to be performed respectively by the lamps 2 and 3, by providing the outer lenses 5 and 10 of the lamps 2 and 3 that lie adjacent to each other.

The invention claimed is:

1. A door mirror for a vehicle, the door mirror comprising:
   a body;
   a turn signal lamp for indicating a traveling direction, the turn signal lamp comprising:
      a turn signal lamp housing held inside the body,
      a turn signal lamp outer lens exposed to the outside of the body, and
      a jointing piece made of a transparent material and provided between the turn signal lamp housing and the turn signal lamp outer lens to integrate the turn signal lamp housing and the turn signal lamp outer lens; and
   a foot lamp comprising a foot lamp outer lens,
   wherein each of the turn signal lamp and the foot lamp is installed in the body as an assembly adjacent to each other with the connection of the jointing piece at a lower end of the turn signal lamp to the foot lamp outer lens so that the turn signal lamp outer lens and the foot lamp outer lens are formed as a successively continuous transparent member such that light based on a turning on of one lamp is guided to the outer lens of the other lamp.

2. The door mirror according to claim 1, wherein the turn signal lamp is located in front of and below the body, and the foot lamp is located behind the turn signal lamp.

3. The door mirror according to claim 1, wherein:
   the turn signal lamp housing and the turn signal lamp outer lens are integrated with the jointing piece formed by injecting transparent resin material to a butt contact part of an outer peripheral edge of the turn signal lamp housing and an outer peripheral edge of the turn signal lamp outer lens,
   a step part is formed at a lower side of the jointing piece,
   a rib piece protruding upward is formed at an upper surface of the foot lamp outer lens,
   an outside diameter side end edge is formed extending to an outside diameter side of the foot lamp outer lens, and
   the foot lamp is installed to the body such that the outside diameter side end edge is butted to the step part of the jointing piece.

4. The door mirror according to claim 3, wherein the turn signal lamp is located in front of and below the body, and the foot lamp is located behind the turn signal lamp.

* * * * *